United States Patent
Ko et al.

(10) Patent No.: US 8,217,835 B2
(45) Date of Patent: Jul. 10, 2012

(54) METHOD AND APPARATUS FOR BEAM-FORMING SIGNAL IN MULTI USER-MIMO WIRELESS COMMUNICATION SYSTEM

(75) Inventors: Eun Seok Ko, Seongnam-si (KR); Jong-Hyung Kwun, Seoul (KR); Sang-hyun Kim, Daejeon (KR); Robert Heath, Jr., Austin, TX (US); Chan-Byoung Chae, Austin, TX (US)

(73) Assignees: Samsung Electronics Co., Ltd., Suwon-si (KR); Board of Regents, The University of Texas System, Austin, TX (US)

( * ) Notice: Subject to any disclaimer, the term of this patent is extended or adjusted under 35 U.S.C. 154(b) by 169 days.

(21) Appl. No.: 12/660,644

(22) Filed: Mar. 2, 2010

(65) Prior Publication Data

US 2010/0220010 A1 Sep. 2, 2010

(30) Foreign Application Priority Data

Mar. 2, 2009 (KR) ........................ 10-2009-0017534

(51) Int. Cl.
*H01Q 3/00* (2006.01)
(52) U.S. Cl. ....................................................... 342/377
(58) Field of Classification Search .................... None
See application file for complete search history.

(56) References Cited

U.S. PATENT DOCUMENTS

2007/0127588 A1* 6/2007 Kim .............................. 375/267

* cited by examiner

*Primary Examiner* — Harry Liu

(57) ABSTRACT

A base station is capable of transmitting a signal in a wireless communication network. The base station decides channel state information matrices of respective channels by determining a state of the channels corresponding to respective transmission antennas. The base station calculates transmission beam forming vectors for the respective transmission antennas by a combination of a dot product and a cross product of the channel state information matrices. Thereafter, the base station beam-forms signals for the respective transmission antennas by using the respective transmission beam forming vectors, and transmitting the beam-formed signals.

20 Claims, 3 Drawing Sheets

METHOD AND APPARATUS FOR BEAM-FORMING SIGNAL IN MULTI USER-MIMO WIRELESS COMMUNICATION SYSTEM

CROSS-REFERENCE TO RELATED APPLICATION(S) AND CLAIM OF PRIORITY

The present application is related to and claims priority to an application entitled "METHOD AND APPARATUS FOR BEAM-FORMING SIGNAL IN MULTI USER-MIMO WIRELESS COMMUNICATION SYSTEM" filed in the Korean Intellectual Property Office on Mar. 2, 2009 and assigned Serial No. 10-2009-0017534, the contents of which are incorporated herein by reference.

TECHNICAL FIELD OF THE INVENTION

The present invention relates to a wireless telecommunications system, and more particularly, to a beam-forming method of a signal for coordinated beam-forming in a multiuser multi-input multi-output (MIMO) wireless communications system, and an apparatus thereof.

BACKGROUND OF THE INVENTION

In a multiuser multi-input multi-output (hereinafter, MIMO) wireless communications system, a base station using a multi-transmission antenna spatial multiplexes and transmits data of each user based on channel information between the base station and a plurality of users, thereby providing a high cell capacity under limited frequency and power resources. Such multiuser-MIMO wireless communication system calculates a beam-forming vector of coordinated beam-forming method when transmitting a signal to a plurality of users, and then, by using this calculated beam-forming vector, transmits a transmission signal optimized for a plurality of users respectively. The process of obtaining a beam-forming vector for typical coordinated beam-forming is performed by a repetitive calculation algorithm, so that it is usually very difficult to accurately measure the number of times of repetitive calculation until it converges into an optimized beam-forming vector. Thus, in the data transmission on the wireless telecommunications system, a delay may occur until the beam-forming vector calculation is converged, such that system instability can be caused. Accordingly, if the number of times of the repetitive calculation is compulsorily limited, the performance of the coordinated beam-forming is reduced due to the imprecision of the beam-forming vector. Moreover, in the repetitive calculation procedure, a complicated matrix operation like Singular Value Decomposition (SVD) should be repeatedly executed.

SUMMARY OF THE INVENTION

To address the above-discussed deficiencies of the prior art, it is a primary object to provide a method and apparatus for beam-forming a signal in a multiuser MIMO wireless communications system, which reduces a delay generated in the transmission of signal and enhances a system stability by quickly and accurately generating a transceiving beam-forming vector in comparison with a typical method.

In accordance with an aspect of the present invention, a method of transmitting a signal includes deciding channel state information matrices of respective channels by determining a state of the channels corresponding to respective transmission antennas; calculating transmission beam forming vectors for the respective transmission antennas by a combination of a dot product and a cross product of the channel state information matrices; and beam-forming signals for the respective transmission antennas by using the respective transmission beam forming vectors, and transmitting the beam-formed signals.

In accordance with another aspect of the present invention, a method of receiving a signal includes deciding any one of a number of reception beam-forming vectors which are calculated by a combination of a dot product and a cross product of channel state information matrices corresponding to respective channels; and beam-forming any one signal of the channels by using the decided reception beam-forming vector and receiving the beam-formed signal.

In accordance with another aspect of the present invention, an apparatus of transmitting a signal includes a plurality of transmission antennas which correspond to respective channels, transmit signals through the respective channels; a channel information determination unit that determines a state of the channels and decides channel state information matrices of the respective channels; a beam-forming controller that calculates transmission beam forming vectors for the respective transmission antennas by a combination of a dot product and a cross product of the channel state information matrices; and a beam-former that beam-forms the signals by using the respective transmission beam forming vectors, and controls transmission of the beam-formed signals in the respective transmission antennas.

In accordance with another aspect of the present invention, an apparatus of receiving a signal includes a beam-forming decision unit that decides any one of reception beam-forming vectors that are calculated by a combination of a dot product and a cross product of channel state information matrices corresponding to respective channels; and a coupling unit that beam-forms any one signal of the channels by using the decided reception beam-forming vector and receives the beam-formed signal.

A method and apparatus for beam-forming a signal in a multiuser MIMO wireless communications system according to the present invention can detect a transceiving beam-forming vector by just an operation of numerical analysis for obtaining a solution of equation not by a complicated operation like SVD in comparison with typical techniques. In addition, in an environment where the clustering of multiuser is possible, the solution of enclosed form is obtained to detect the transceiving beam-forming vector and, by using this detected vector, the multiuser MIMO antenna system can be implemented.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
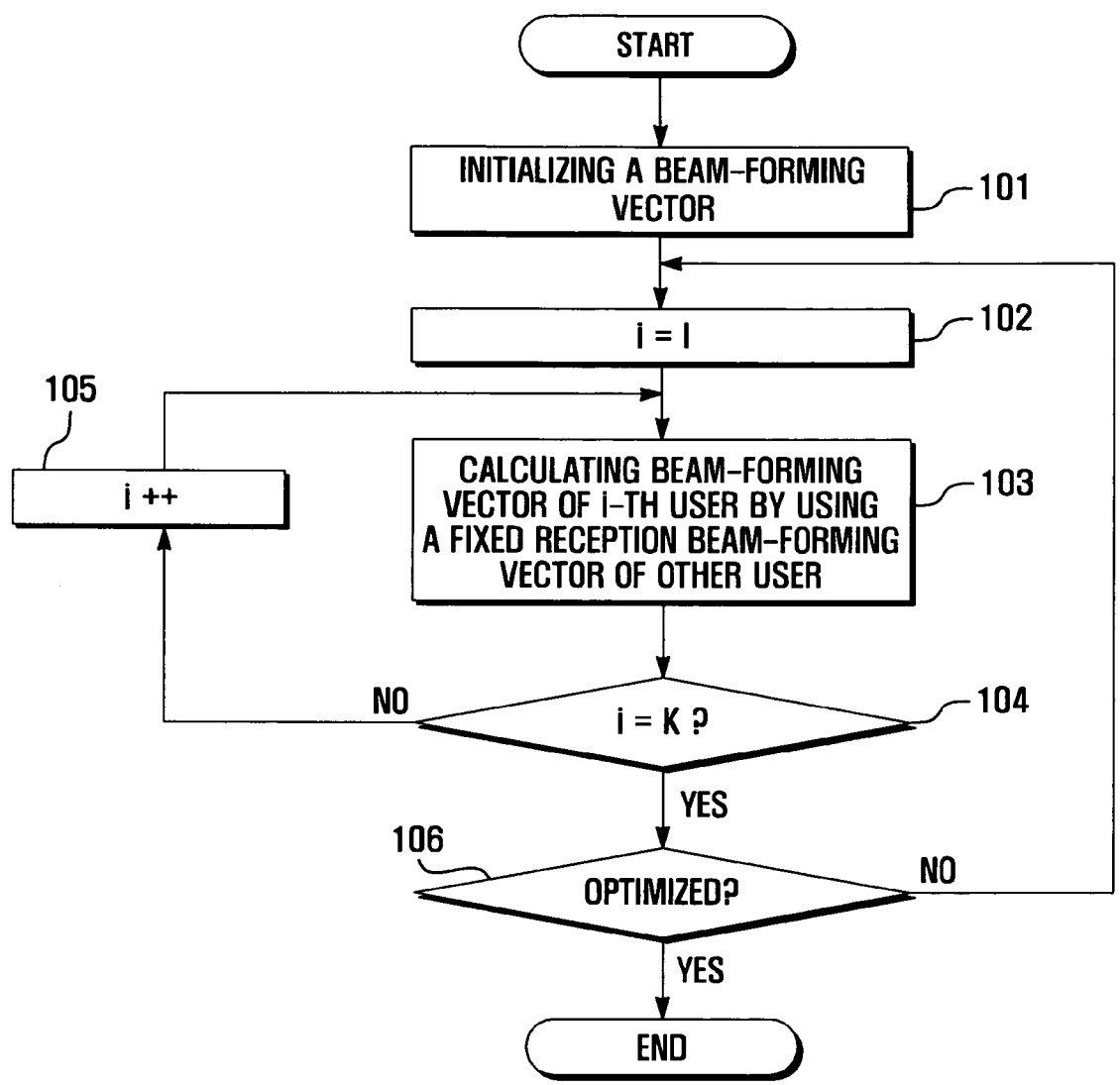
FIG. 1 illustrates a method of detecting a typical transceiving beam-forming vector for coordinated beam-forming in a multiuser MIMO wireless communications system.
Figure 2:
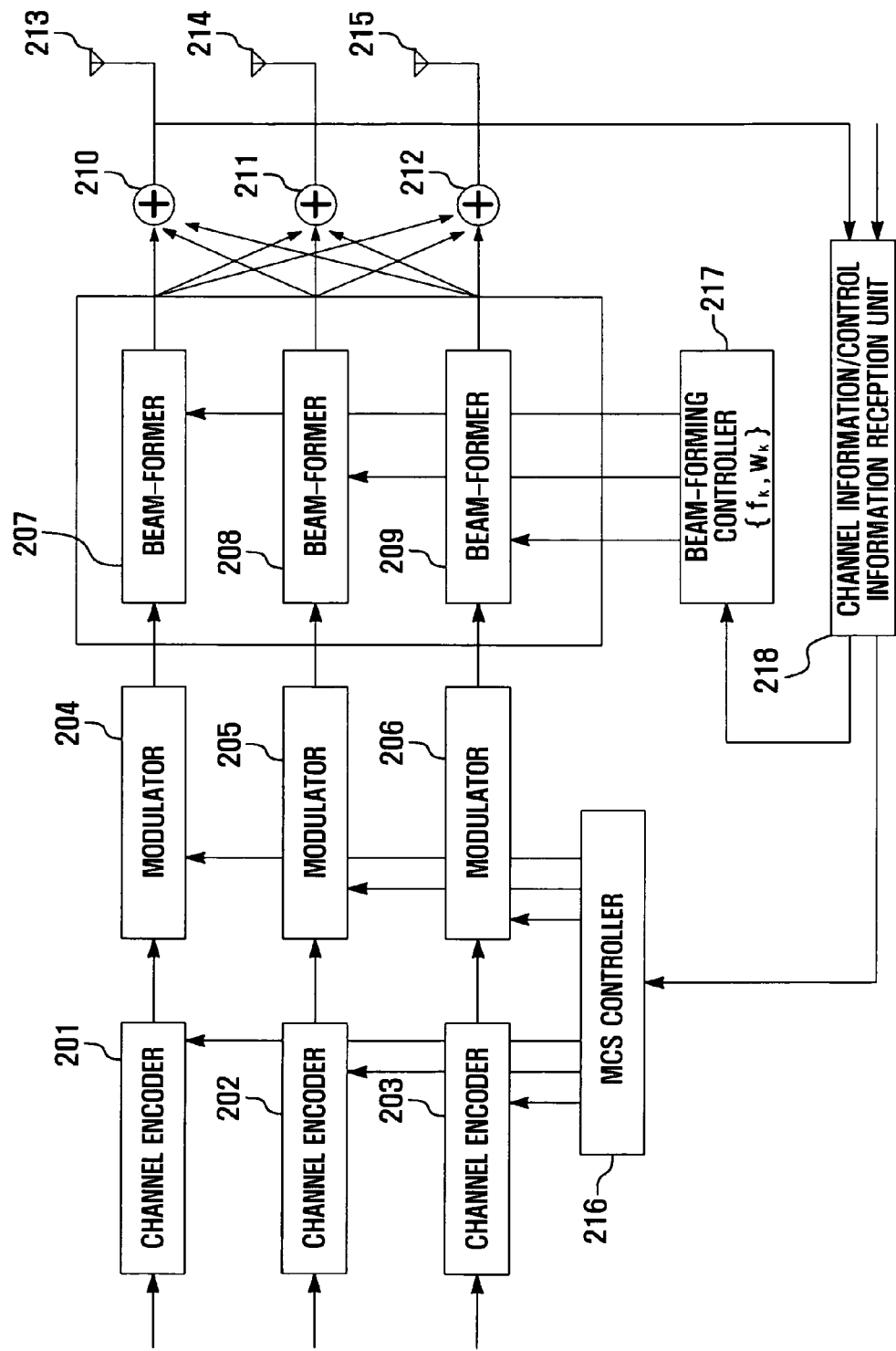
FIG. 2 illustrates a transmission apparatus in a multiuser MIMO wireless communications system according to an exemplary embodiment of the present invention.
Figure 3:
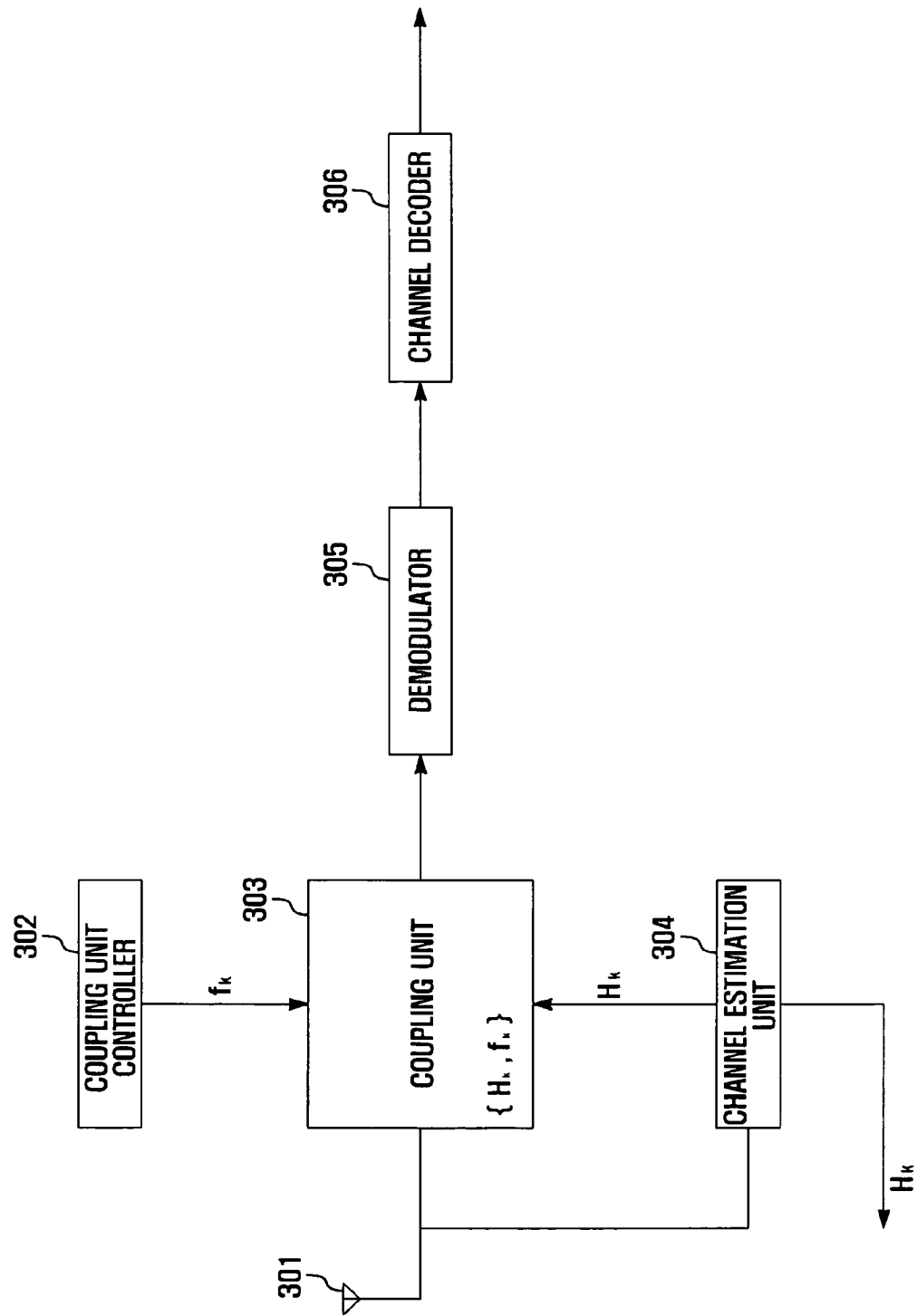
FIG. 3 illustrates a reception apparatus in a multiuser MIMO wireless communications system according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

FIG. 1 illustrates a method of detecting a typical transceiving beam-forming vector for coordinated beam-forming in a multiuser MIMO wireless communications system.

Referring to FIG. 1, in a multiuser MIMO wireless communications system, the calculation of transceiving beam-forming vector of coordinated beam-forming method can be performed by using downlink channel information with all users in a base station, which is a transmitting side, to obtain a transmission beam-forming vector and a reception beam-forming vector. However, the detected transmission beam-forming vector and reception beam-forming vector should satisfy that interference between users is not generated at all in case of passing through a combining process in terminal. Generally, the transmission beam-forming vector and reception beam-forming vector can be obtained through the following repetitive calculation procedure. However, the transmission beam-forming vector and reception beam-forming vector can also be obtained by a solution of closed form with respect to a limited antenna configuration (2×2).

More particularly, in the general beam-forming vector detecting method, a reception beam-forming vector of total users is initialized to begin a beam-forming vector detection procedure (block 101). The transmission beam-forming vector of i-th user is detected by assigning 1 to i (block 102). At this time, the reception beam-forming vector can be detected from the transmission beam-forming vector of user. And then, the base station detects the transmission beam-forming vector optimized for i-th user, by using a fixed reception beam-forming vector of other user except i-th user (block 103). At this time, the reception beam-forming vector of i-th user can be detected from the transmission beam-forming vector. Moreover, the base station determines whether i is K, i.e., it is identical with the number of total users (block 104). In case the process of detecting the transmission beam-forming vector and the reception beam-forming vector are not executed with respect to total users, i.e., in case it is determined that i is smaller than K at step 104, i is increased by 1 to execute block 103 again (block 105). In case it is determined that i and K are the same at block 104, i.e., in case it is determined that the process of detecting the transmission beam-forming vector and the reception beam-forming vector are executed with respect to total users, it is determined whether the detected transmission beam-forming vector and the reception beam-forming vector are a converged value, i.e., an optimized value (block 106). If it is determined that the transmission beam-forming vector and the reception beam-forming vector detected at block 106 are not optimized value, the above described procedure from block 102 is re-executed to detect optimized transmission beam-forming vector and reception beam-forming vector. Moreover, if it is determined that the transmission beam-forming vector and the reception beam-forming vector detected at block 106 are optimized value, signal is transmitted by using the detected transmission beam-forming vector, and terminal estimates a transmitted signal by processing a reception signal by using such a reception signal and a reception beam-forming vector. Moreover, since the base station and the terminal share the reception beam-forming vector, the base station uses a following pilot signal in order to send the detected reception beam-forming vector to the terminal. That is, when a dedicated pilot channel is assigned so as to prevent duplicate usage by each terminal, and the pilot signal is pre-coded into the transmission beam-forming vector corresponding to the reception beam-forming vector of each terminal to be transmitted, the terminal detects the transmission beam-forming vector from the received pilot signal, and detects and uses the reception beam-forming vector from the detected transmission beam-forming vector. As described above, the process for calculating the transmission beam-forming vector and the reception beam-forming vector are proceeded with a repetitive calculation process, so that it is very difficult to accurately measure the number of times of repetitive calculation until it converges into the optimized beam-forming vector. Moreover, as to the data transmission in a wireless communications system, it is possible that a delay can be caused until the transceiving beam-forming vector calculation is converged so that system instability can be caused. In the present invention, in order to solve such problem, when using the coordinated beam-forming method in a multiuser MIMO wireless communications system, a method of quickly and accurately calculating a transceiving beam-forming vector by using the dot product and cross product of vector is proposed.

FIG. 2 illustrates a transmission apparatus in a multiuser MIMO wireless communications system according to an exemplary embodiment of the present invention.

At this time, in the present embodiment, it is assumed that transmission antenna is three, but it is not limited to this example. Referring to FIG. 2, a base station, which is a transmission apparatus in the multiuser MIMO wireless communications system, according to an exemplary embodiment of the present invention includes a channel encoder 201, 202, and 203, a modulator 204, 205, and 206, a beam-former 207, 208, and 209, a transmission signal merge unit 210, 211, and 212, a transmission antenna 213, 214, and 215, a modulation and coding scheme (MCS) controller 216, a beam-forming controller 217, and a channel information/control information reception unit 218. The number of transmission antennas 213, 214, and 215 is three, and the number of reception antenna (not shown) is $N_r$. Transmission antenna 213, 214, and 215 corresponds to each channel, and transmits a signal through each channel. At this time, a signal transmitted from one transmission antenna 213, 214, and 215 can be composed of only a signal transmitted to one terminal, and can be composed of the merge of signals transmitted to plural terminals. In this case, the transmission signal merge unit 210, 211, and 212 merges signals transmitted to plural terminals. Signals for transmitting to the terminal are encoded with a corresponding method in the channel encoder 201, 202, and 203 and the modulator 204, 205, and 206 modulates the encoded bit string that is provided from the channel encoder 201, 202, and 203 and outputs a complex symbol. The channel information/control information reception unit 218 receives channel information or control information in the configuration of upper level or terminal, which the base station controls and transmits the received channel information or control information to the beam-forming controller 217 and the MCS controller 216. The MCS controller 216 controls the encoding process and the modulation process of channel encoder 201, 202, and 203 and modulator 204, 205, and 206, by using control information received from the channel information/control information reception unit 218. According to the embodiment of the present invention, the beam-forming controller 217 calculates transmission beam-forming vectors for each transmission antenna 213, 214, and 215, by using the channel information received from the channel information/control information reception unit 218. At this time, the beam-forming controller 217 includes a channel information determination unit (not shown) for determining the state of channels from the channel information. That is, the channel information determination unit determines the state of channels corresponding to each transmission antenna 213, 214, and 215 and decides channel state information matrices of respective channels. And the beam-forming controller 217 calculates transmission beam-forming vectors for respective transmission antennas 213, 214, and 215 by the combination of the dot product and the cross product of channel state information matrices. The beam-former 207, 208, and 209 beam-forms complex symbol outputted from the modulator 204, 205, and 206 by using the transmission beam-forming vector calculated according to the embodiment of the present invention. In the multiuser MIMO wireless communications system according to an exemplary embodiment of the present invention, the beam-forming controller 217 of base station, which is a transmission apparatus, the following can be assumed in order to perform the beam-forming vector calculation operation.

First, the base station knows downlink channel information about all users. An uplink sounding channel can be utilized in a Time Division Duplexing (TDD) mode in order to know the downlink channel information. Alternatively, the downlink channel information estimated by terminal can be fed back through a feedback channel.

Second, if the channel information between each base station and terminal can be shared by the cooperation of a plurality of base stations, it can be used in a plural base station cooperation method (clustering).

Third, the channel between the base station and the terminal is a frequency nonselective flat fading channel. In case of using the Orthogonal Frequency Division Multiplexing (OFDM) technique, the channel to which each subcarrier is transmitted can be assumed to be a frequency nonselective fading channel, while it can be accepted that a channel of slowly moving terminal changes slowly.

Fourth, the number of users who can transmit at once is maximum three while each user uses a single stream.

In the meantime, it is a condition of the coordinated beam-forming method in a multiuser MIMO antenna system that interference between each multiuser is removed, so that such condition is reflected to Equation 1 for obtaining transmission beam-forming vector $f_k$ and be modeled like Equation 1.

$$\text{Given } R_1, R_2, R_3 \in H_{3\times 3}, \text{ find } f_1, f_2, f_3 \in C^3 \text{ s.t. } f_i \in \bigcap_{j\neq i}(R_j f_j)^\perp \quad \text{[Eqn. 1]}$$

Here, k indicates an index of channel by transmission antenna 213, 214, and 215, $R_k$ indicates $H_k^H H_k$, $H_k$ indicates channel state information matrix, and $(a)^\perp$ indicates a space orthogonal to a. In the present invention, the method for obtaining the transmission beam-forming vector $f_k$ in such environment by using the dot product and cross product of vector is proposed. First, the dot product and the cross product of vector are defined for arbitrary complex vector v and w like Equation 2 and Equation 3.

$$v \cdot w = w^* v \quad \text{[Eqn. 2]}$$

$$= \sum v_i \bar{w}_i$$

$$= e_1 v_2 \bar{w}_3 + e_2 v_3 \bar{w}_1 + e_3 v_1 \bar{w}_2 - \quad \text{[Eqn. 3]}$$

$$e_1 v_3 \bar{w}_2 - e_2 v_1 \bar{w}_3 - e_3 v_2 \bar{w}_1.$$

where, $e_1 = [1\ 0\ 0]^T$, $e_2 = [0\ 1\ 0]^T$, $e_3 = [0\ 0\ 1]^T$

The dot product and the cross product of vector defined like above satisfy a condition of Equation 4.

For complex vectors a, b, c ∈ $C^3$ $$(1) a \cdot b = b^* a = \overline{b \cdot a} \quad \text{[Eqn. 4]}$$

$$(2) a \times b = \overline{b \times a}$$

$$(2)' a \times b = 0 \text{ if } \bar{b} = \lambda a, \exists \lambda \in C^3$$

$$(3)(a \times b) \cdot e = \begin{bmatrix} a_1 & a_2 & a_3 \\ \bar{b}_1 & \bar{b}_2 & \bar{b}_3 \\ \bar{c}_1 & \bar{c}_2 & \bar{c}_3 \end{bmatrix}$$

$$(3)'(\bar{a} \times b) \cdot a = 0 \text{ and } (\bar{a} \times b) \cdot b = 0$$

$$(4) R \in H_{3\times 3} \Rightarrow Ra \cdot b = a \cdot Rb,$$

where H denotes Hermitian

The relation of transmission beam-forming vector f1, f2 and f3 is obtained by using the characteristic of the dot product and the cross product of vector, so that Equation 5 to Equation 8 can be induced.

$$\text{For } f_1 \in C^3, \text{ set} \quad \text{[Eqn. 5]}$$

$$f_2 := \overline{R_1 f_1} \times R_2 f_1$$

$$f_3 := \overline{R_1 f_1} \times R_3 f_1$$

$$R_1 f_1 \cdot f_2 = \overline{f_2 \cdot R_1 f_1} \quad \text{[Eqn. 6]}$$

$$= \overline{(\overline{R_1 f_1} \times R_2 f_1) \cdot R_1 f_1}$$

$$= \bar{0}$$

$$= 0$$

$$f_1 \cdot R_2 f_2 = R_2 f_1 \cdot f_2 \quad \text{[Eqn. 7]}$$

$$= \overline{f_2 \cdot R_2 f_1}$$

$$= \overline{(\overline{R_1 f_1} \times R_2 f_1) \cdot R_2 f_1}$$

$$= \bar{0}$$

$$= 0$$

$$R_1 f_1 \cdot f_3 = 0 = f_1 \cdot R_3 f_3 \quad \text{[Eqn. 8]}$$

In the meantime, in the present embodiment, since the removing of interference between multiuser is a condition for the determination of transceiving beam-forming vector in a multiuser-MIMO antenna system, the relation like Equation 9 and Equation 10 is derived, and the relation of Equation 11 is formed by the condition (3)' of Equation 4.

$$R_2 f_2 \cdot f_3 = 0 = f_2 \cdot R_3 f_3 \Leftrightarrow f_2 \cdot R_2 f_3 = 0 = f_2 \cdot R_3 f_3 \qquad \text{[Eqn. 9]}$$

$$(\overline{R_2 f_3} \times R_3 f_3) \cdot R_3 f_3 = 0 \qquad \text{[Eqn. 10]}$$

According to Equation 9, Equation 10, and the condition of $f_2 \cdot R_3 f_3 = 0$, Equation 11 is derived.

$$f_2 \| (\overline{R_2 f_3} \times R_3 f_3)$$

i.e., $$(\overline{R_1 f_1} \times R_2 f_1) \| (\overline{R_2 (\overline{R_1 f_1} \times R_3 f_1)} \times R_3 (\overline{R_1 f_1} \times R_3 f_1)) \Leftrightarrow$$
$$(\overline{R_1 f_1} \times R_2 f_1) \times (\overline{R_2 (\overline{R_1 f_1} \times R_3 f_1)} \times R_3 (\overline{R_1 f_1} \times R_3 f_1)) = 0 \qquad \text{[Eqn. 11]}$$

In conclusion, the problem of obtaining the transmission beam-forming vector $f_k$ results in the problem of obtaining a solution of Equation 11. $f_1$ can be obtained by solving Equation 11, $f_2$ and $f_3$ can be obtained by using the relation of $f_1$ and $f_2$ of Equation 7 and the relation of $f_1$ and $f_3$ of Equation 8. In the meantime, if it is an environment in which the clustering of multiuser is possible in the multiuser MIMO wireless communications system, the transmission beam-forming vector $f_k$ can be obtained similar to Equation 12. That is, if any two of transmission antennas 213, 214, and 215 transmit the same signal due to clustering, the transmission beam-forming vector $f_k$ can be obtained similar to Equation 12. However, in Equation 12, it is assumed that it is clustered in such a manner that second user and third user receive the same transmission signal.

Given the input symbols a, b, the receives symbols can be expressed as $$y_1 = \frac{P}{2} w_1^* H_1 f_1 a + \underbrace{\frac{P}{4} w_1^* H_1 f_2 b + \frac{P}{4} w_1^* H_1 f_3 b}_{\text{interferences}} + w_1^* n_1 \qquad \text{[Eqn. 12]}$$
$$\underbrace{\phantom{\frac{P}{2} w_1^* H_1 f_1 a}}_{\text{desired signal}}$$

$$y_2 = \underbrace{\frac{P}{4} w_2^* H_2 f_2 b + \frac{P}{4} w_2^* H_2 f_3 b}_{\text{desired signal}} + \underbrace{\frac{P}{2} w_2^* H_2 f_1 a}_{\text{interferences}} + w_2^* n_2$$

$$y_3 = \underbrace{\frac{P}{4} w_3^* H_3 f_3 b + \frac{P}{4} w_3^* H_3 f_2 b}_{\text{desired signal}} + \underbrace{\frac{P}{2} w_3^* H_3 f_1 a}_{\text{interferences}} + w_3^* n_1$$

In Equation 12, each transmission beam-forming vector $f_k$ can be expressed like Equation 13.

$$f_1 = V_1^{(1)}$$

$$f_2 = \overline{R_1 f_1} \times R_2 f_1$$

$$f_3 = \overline{R_1 f_1} \times R_3 f_1 \qquad \text{[Eqn. 13]}$$

Here, $V_1^{(1)}$ is a principle left side singular vector of channel state information matrix $H_1$.

FIG. 3 illustrates a reception apparatus in a multiuser MIMO wireless communications system according to an exemplary embodiment of the present invention.

Referring to FIG. 3, a terminal that is a reception apparatus in the multiuser MIMO wireless communications system according to an exemplary embodiment of the present invention includes a reception antenna 301, a coupling unit controller 302, a coupling unit 303, a channel estimation unit 304, a demodulator 305, and a channel decoder 306. The reception antenna 301 receives a signal transmitted from base station through a specific channel, and the received signal is transmitted to the coupling unit 303 and the channel estimation unit 304. The channel estimation unit 304 determines the state of channel through the received signal and generates channel state information matrix Hk, and transmits it to the coupling unit 303.

Moreover, the channel state information matrix Hk generated in the channel estimation unit 304 can be transmitted to the base station. The coupling unit 303 detects the transmission beam-forming vector $f_k$ of the signal received in the coupling unit 303 and transmits it to the coupling unit 303. The coupling unit 303 filters a signal transmitted to a corresponding terminal, and receives the filtered signal. At this time, the coupling unit 303 includes a beam-forming decision unit (not shown) for calculating the reception beam-forming vector by using the channel state information matrix and the transmission beam-forming vector. That is, in case the reception beam-forming vector is determined in the beam-forming decision unit, the coupling unit 303 beam-forms a signal transmitted to a corresponding terminal by using the reception beam-forming vector and receives it. The demodulator 305 generates encoded data bit by demodulating a signal filtered in the coupling unit 303, i.e., complex symbol, and the channel decoder 306 decodes the encoded data bit by a corresponding method and estimates a transmission signal.

Hereinafter, the reception beam-forming process performed in the coupling unit 303 is illustrated in detail. When a signal that is transmitted to terminal from base station is $x_k$, and a transmission beam-forming vector of a corresponding terminal is $f_k$, a transmission beam formed signal of the corresponding terminal becomes $f_k x_k$. And then, a signal $y_k$ that is received after a reception beam-forming step in the coupling unit 303 of the corresponding terminal can be expressed in Equation 14.

$$y_k = w_k^H H_k f_k x_k + w_k^H H_k \sum_{l=1, l \ne k}^{K} f_l x_l + w_k^H n_k \qquad \text{[Eqn. 14]}$$

Here, $w_k$ indicates a reception beam-forming vector, K indicates the number of total user simultaneously transmitted, and $n_k$ indicates a Gaussian noise vector of k-th user. In addition, referring to Equation 14, the reception beam-forming vector can be expressed similar to Equation 15 by using the relation between the transmission beam-forming vector and the channel state information matrix.

$$W_k = H_k f_k \qquad \text{[Eqn. 15]}$$

Referring to Equation 15, reception beam-forming vector $w_k$ is determined by the transmission beam-forming vector $f_k$. Thus, the base station transmits a generated transmission beam-forming vector $f_k$ to terminal, so that terminal can generate reception beam-forming vector $w_k$. At this time, base station uses a beam-forming technique of pilot signal so as to send the transmission beam-forming vector $f_k$ to terminal. After dedicated pilot channel is assigned so as to prevent duplicate usage by each terminal, the base station beam-forms a pilot signal with transmission beam-forming vector $f_k$ of each terminal, and transmits the beam-formed pilot signal.

Moreover, the coupling unit controller 302 of the terminal detects transmission beam-forming vector $f_k$ from the received pilot signal. As described above, the coupling unit 303 can perform the reception beam-forming process, since it recognizes the reception beam-forming vector by using the transmission beam-forming vector $f_k$ which is detected by receiving the pilot signal before receiving a signal and $H_k$ generated in the channel estimation unit. In the meantime, in the above-described embodiment, base station beam-forms a signal by using transmission beam-forming vector and transmits it, while the terminal detects transmission beam-forming vector in signal and calculates reception beam-forming vector. But, it is not limited to this. That is, the present invention can be implemented in such a manner that base station calculates reception beam-forming vector with transmission beam-forming vector and channel state information matrix according to Equation 15 and transmits it to terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting a signal, comprising:
    deciding channel state information matrices of respective channels by determining a state of the channels corresponding to respective transmission antennas;
    calculating transmission beam forming vectors for the respective transmission antennas by a combination of a dot product and a cross product of the channel state information matrices; and
    beam-forming signals for the respective transmission antennas by using the respective transmission beam forming vectors, and transmitting the beam-formed signals.

2. The method of claim 1, wherein the respective transmission antenna consists of three antennas, wherein, in calculating transmission beam forming vectors, the transmission beam forming vectors are calculated by the following:

$$(\overline{R_1 f_1} \times R_2 f_1) \times (\overline{R_2(\overline{R_1 f_1} \times R_3 f_1)} \times R_3(\overline{R_1 f_1} \times R_3 f_1)) = 0$$

$$f_2 = \overline{R_1 f_1} \times R_2 f_1$$

$$f_3 = \overline{R_1 f_1} \times R_3 f_1$$

where k indicates an index of the channel, $f_k$ indicates a transmission beam-forming vector, $R_k$ indicates $H_k^H H_k$, and $H_k$ indicates channel state information matrix.

3. The method of claim 1, further comprising:
    calculating reception beam-forming vectors corresponding the respective transmission antennas with the channel state information matrices and the transmission beam forming vectors; and
    transmitting the reception beam-forming vectors through the transmission antennas.

4. The method of claim 2, wherein, in calculating transmission beam forming vectors, in case any two of the transmission antennas transmit the same signal due to clustering, a rest transmission antenna among the transmission antennas is calculated as a principle left side singular vector of channel state information matrix of the rest transmission antenna among the transmission antennas.

5. The method of claim 1, wherein, in calculating transmission beam forming vectors, in case any two of the transmission antennas transmit a same signal due to clustering, a rest transmission antenna among the transmission antennas is calculated as a principle left side singular vector of channel state information matrix of the rest transmission antenna among the transmission antennas.

6. The method of claim 1, wherein the respective transmission antenna comprise at least three antennas.

7. The apparatus of claim 1, wherein the respective transmission antenna comprise at least three antennas.

8. A method of receiving a signal, comprising:
    deciding any one of reception beam-forming vectors which are calculated by a combination of a dot product and a cross product of channel state information matrices corresponding to respective channels; and
    beam-forming any one signal of the channels by using the decided reception beam-forming vector and receiving the beam-formed signal.

9. The method of claim 8, wherein the reception beam-forming vectors are calculated from transmission beam-forming vectors which are calculated by the following:

$$(\overline{R_1 f_1} \times R_2 f_1) \times (\overline{R_2(\overline{R_1 f_1} \times R_3 f_1)} \times R_3(\overline{R_1 f_1} \times R_3 f_1)) = 0$$

$$f_2 = \overline{R_1 f_1} \times R_2 f_1$$

$$f_3 = \overline{R_1 f_1} \times R_3 f_1$$

where k indicates an index of the channel, $f_k$ indicates a transmission beam-forming vector, $R_k$ indicates $H_k^H H_k$, and $H_k$ indicates channel state information matrix.

10. The method of claim 9, wherein deciding any one of reception beam-forming vectors comprises:
    detecting a transmission beam-forming vector of a pilot signal, generating state information matrices corresponding to the pilot signal, when receiving the pilot signal; and
    calculating the reception beam-forming vector by using the transmission beam-forming vector and the channel state information matrix.

11. The method of claim 8, wherein deciding any one of the reception beam-forming vectors comprises:
    detecting a transmission beam-forming vector of a pilot signal;
    generating state information matrices corresponding to the pilot signal, when receiving the pilot signal; and
    calculating the reception beam-forming vector by using the transmission beam-forming vector and the channel state information matrix.

12. An apparatus for transmitting a signal, comprising:
    a plurality of transmission antennas which correspond to respective channels, the plurality of transmission antennas configured to transmit signals through the respective channels;
    a channel information determination unit configured to determine a state of the channels and decide channel state information matrices of the respective channels;
    a beam-forming controller configured to calculate transmission beam forming vectors for respective transmission antennas of the plurality of transmission antennas by a combination of a dot product and a cross product of the channel state information matrices; and
    a beam-former configured to beam-form the signals by using the respective transmission beam forming vectors, and control to transmit the beam-formed signals in the respective transmission antennas.

13. The apparatus of claim 12, wherein the respective transmission antenna consists of three antennas, and the beam-forming controller is configured to calculate the transmission beam forming vectors by the following:

$$(\overline{R_1 f_1} \times R_2 f_1) \times (\overline{R_2(\overline{R_1 f_1} \times R_3 f_1)} \times R_3(\overline{R_1 f_1} \times R_3 f_1)) = 0$$

$$f_2 = \overline{R_1 f_1} \times R_2 f_1$$

$$f_3 = \overline{R_1 f_1} \times R_3 f_1$$

where k indicates an index of the channel, fk indicates a transmission beam-forming vector, $R_k$ indicates $H_k^H H_k$, and $H_k$ indicates channel state information matrix.

14. The apparatus of claim 12, wherein the beam-forming controller is further configured to calculate reception beam-forming vectors corresponding the respective transmission antennas with the channel state information matrices and transmission beam forming vectors, and transmit the reception beam-forming vectors through the respective transmission antennas.

15. The apparatus of claim 13, wherein, in case any two of the respective transmission antennas transmit the same signal due to clustering, the beam-forming controller is further configured to calculate a rest transmission antenna among the plurality of transmission antennas as a principle left side singular vector of channel state information matrix of the rest transmission antenna among the plurality of transmission antennas.

16. The apparatus of claim 12, wherein, in case any two of the respective transmission antennas transmit a same signal due to clustering, the beam-forming controller is further configured to calculate a rest transmission antenna among the plurality of transmission antennas as a principle left side singular vector of channel state information matrix of the rest transmission antenna among the plurality of transmission antennas.

17. An apparatus for receiving a signal, comprising:
a beam-forming decision unit configured to decide any one of reception beam-forming vectors which are calculated by a combination of a dot product and a cross product of channel state information matrices corresponding to respective channels; and
a coupling unit configured to beam-form any one signal of the channels by using the decided reception beam-forming vector and receive the beam-formed signal.

18. The apparatus of claim 17, wherein the reception beam-forming vectors are calculated from transmission beam-forming vectors which are calculated by the following:

$$(\overline{R_1 f_1} \times R_2 f_1) \times (\overline{R_2(\overline{R_1 f_1} \times R_3 f_1)} \times R_3(\overline{R_1 f_1} \times R_3 f_1)) = 0$$

$$f_2 = \overline{R_1 f_1} \times R_2 f_1$$

$$f_3 = \overline{R_1 f_1} \times R_3 f_1$$

where k indicates an index of the channel, fk indicates a transmission beam-forming vector, $R_k$ indicates $H_k^H H_k$, and $H_k$ indicates channel state information matrix.

19. The apparatus of claim 18, further comprising:
a channel estimation unit configured to generate a state information matrix corresponding to a pilot signal, when receiving the pilot signal; and
a coupling unit controller configured to detect a transmission beam-forming vector of the pilot signal to transmit to the coupling unit,
wherein the beam-forming decision unit is further configured to calculate the reception beam-forming vector by using the transmission beam-forming vector and the channel state information matrix.

20. The apparatus of claim 17, further comprising:
a channel estimation unit configured to generate a state information matrix corresponding to a pilot signal, when receiving the pilot signal; and
a coupling unit controller configured to detect a transmission beam-forming vector of the pilot signal to transmit to the coupling unit,
wherein the beam-forming decision unit is further configured to calculate the reception beam-forming vector by using the transmission beam-forming vector and the channel state information matrix.

* * * * *